Dec. 15, 1964   J. E. GORRELL   3,161,455
BAR CHART RECORDING SYSTEM HAVING A PLURALITY
OF PRESELECTED CODED PATTERNS
Filed Oct. 4, 1960   2 Sheets-Sheet 1
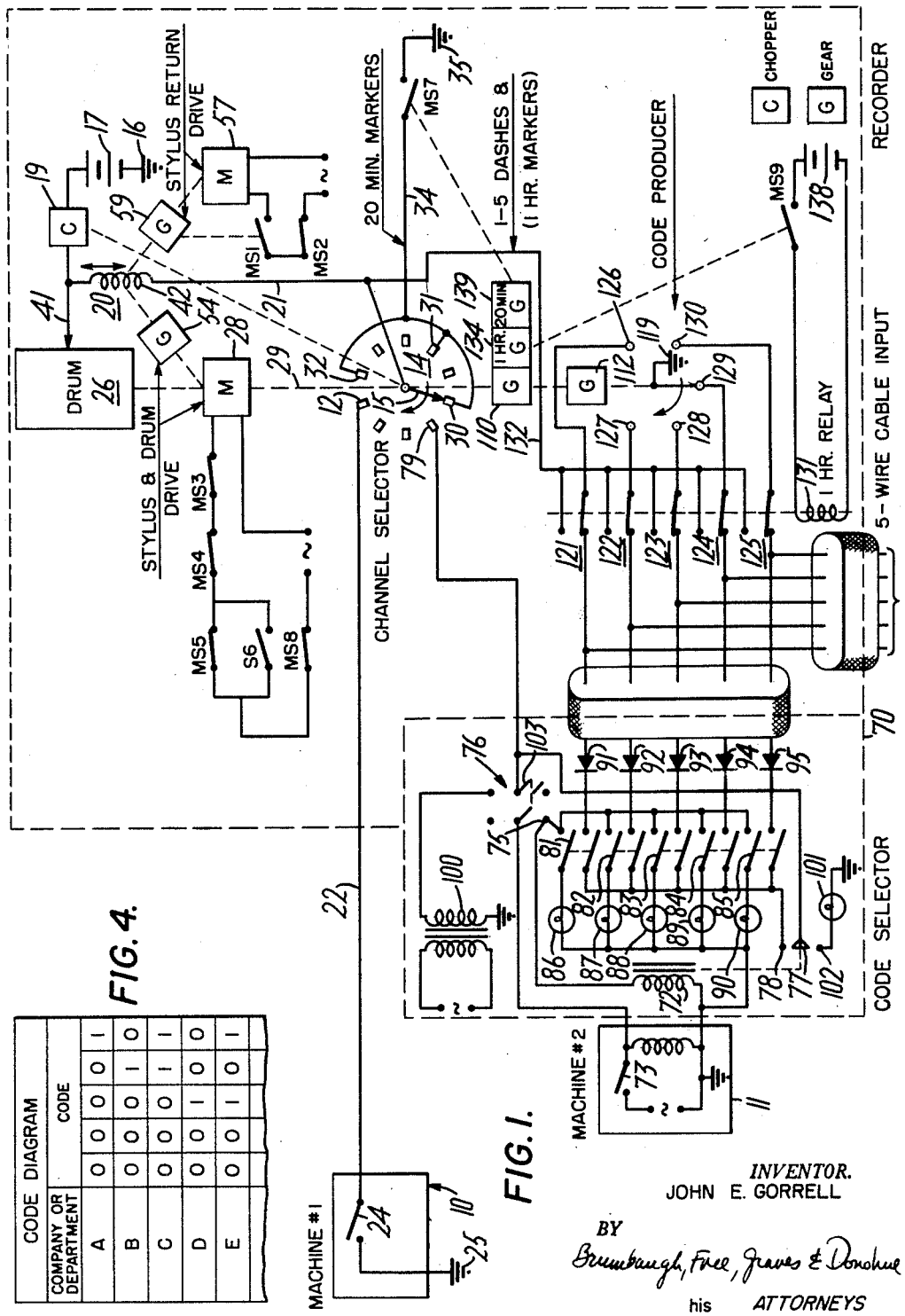
INVENTOR.
JOHN E. GORRELL
BY
Brumbaugh, Free, Graves & Donohue
his ATTORNEYS

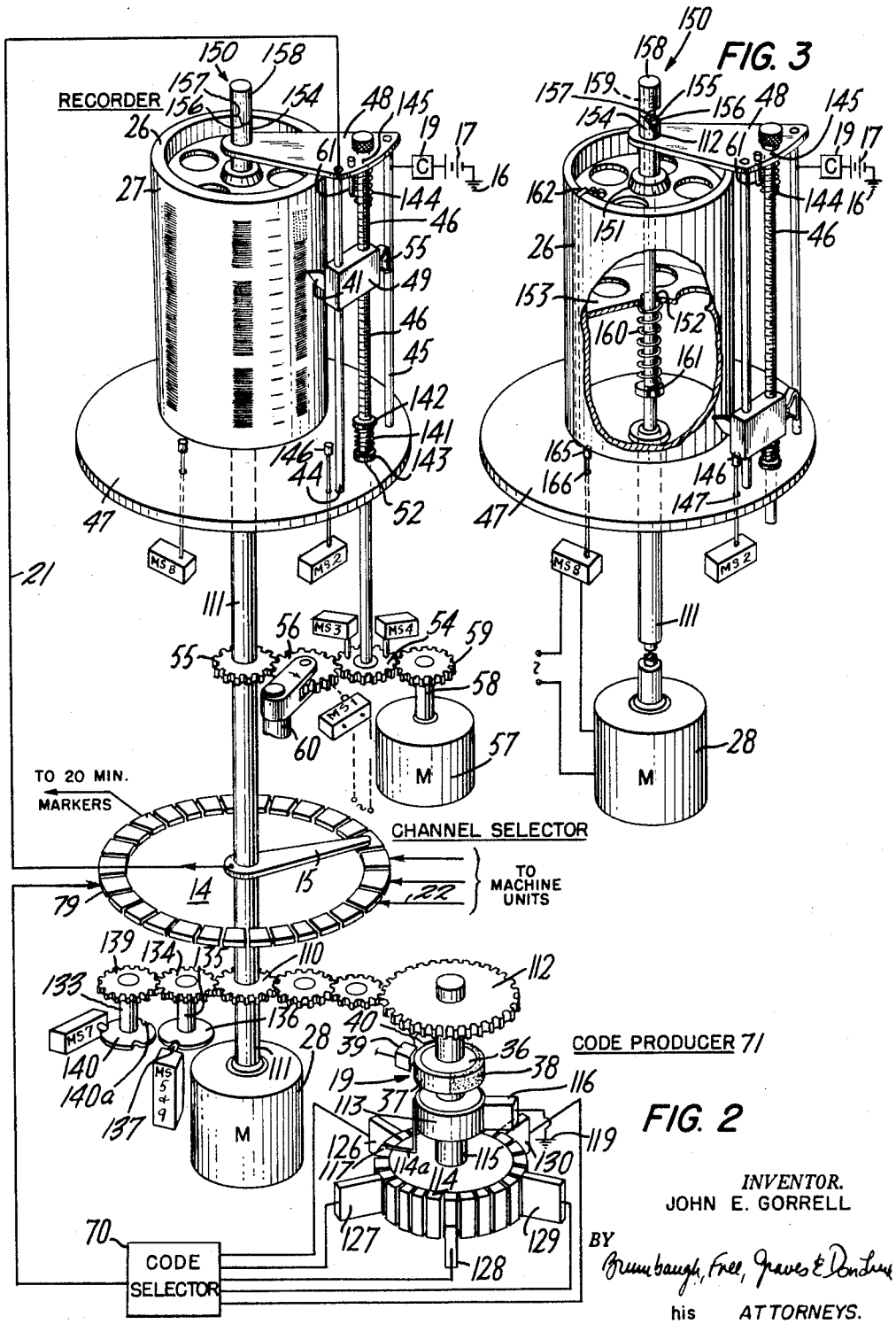

United States Patent Office 3,161,455
Patented Dec. 15, 1964

3,161,455
BAR CHART RECORDING SYSTEM HAVING A PLURALITY OF PRESELECTED CODED PATTERNS
John E. Gorrell, Ridgewood, N.J., assignor to Electronic Associates, Inc., Long Branch, N.J., a corporation of New Jersey
Filed Oct. 4, 1960, Ser. No. 60,507
12 Claims. (Cl. 346—45)

The present invention relates to recording systems, and more particularly, to an automatic bar graph recording system having a plurality of data channels.

A printed multiple bar graph, which contains a record of at least two parameters, can be obtained by energizing a stylus, disposed adjacent a recording paper which is carried by a rotatable drum, with electrical signals representing one parameter and by moving the stylus across the surface of the recording paper in accordance with another parameter during the period that the electrical signals are expected.

If one parameter, such as the on-off time of an electrical device, is plotted against another parameter, such as time, spaces in the printed recording denote the off-periods of the device, while the printed portions denote the on-time of the device. However, there is normally no way of determining the particular function that was performed by the machine by an inspection of the bar graph. Also, when the machine is down or inoperative because of mechanical failure, there is normally no way of distinguishing that condition from one in which it is desired that the machine be inoperative.

Additionally, if a plurality of machines are monitored and corresponding bar graphs are recorded on the recording paper, the operation of the plurality of machines cannot be readily distinguished from each other, unless the sequence of individual graphs is identified in some manner with particular machines.

Therefore, it is an object of the invention to provide a recording system with code producing means which can be used to distinguish the recordings printed in a plurality of channels and also between the recordings printed in a single channel.

Another object of the present invention is to provide a code producing bar graph recording system in which a coded bar is printed for each of a plurality of machines or devices to be monitored so that each of the plurality of devices can be identified and distinguished from the other of the devices; and moreover, to change the code of portions of the bar graph printed for each monitored device so that one recorded period can be distinguished from another recorded period of the same machine.

In accordance with the invention, the recording system is adapted to be energized by electrical means associated with each machine and connected to the recording system for monitoring the operating and nonoperating periods of each of said devices. More particularly, a stylus circuit is energized during a sampling period when the monitored electrical device is operating or when the electrical device is defective and not operable. A recording paper or sheet, disposed in the path of a movable stylus and attached to a rotatable drum, is used as a recording medium, and marks are recorded in a conventional manner on the paper when the stylus circuit is energized.

Code selector means may be connected electrically to each of a plurality of devices to be monitored by the recording system. The code selector means is provided with means for selecting one of a plurality of codes to be recorded over the period that the device is operating.

Code producing means is electrically connected to the code selector means for generating the code selected for a particular function of the device. The stylus circuit may be connected electrically to the code producer means and is energized thereby during preselected periods when each of the devices is monitored, whereby coded marks are recorded on the recording paper to reproduce the code selected to identify the operation of the electrical device or devices to which the code selectors are electrically connected. Thus, the operation of one device can be distinguished from another device by the coding pattern employed for the devices. Moreover, by changing the code pattern used to identify a particular device, portions of the time the device is monitored can be distinguished from other periods during which the device is monitored.

Further objects and features of the invention will be apparent from a reading of the following detailed description when taken in conjunction with the accompanying drawings, in which:

FIGURE 1 is a schematic diagram of the electrical system of the invention;

FIG. 2 is a schematic diagram of the corresponding mechanical system of the invention;

FIG. 3 is a three dimensional view of the rotatable drum and associated electrical components; and FIG. 4 is a code pattern diagram, in accordance with the invention.

Referring now to FIGS. 1 and 2, two machines 10 and 11 are shown connected electrically to the recording system of the invention. These machines are illustrative of what may be any desired plurality of machines, the operation of which can be monitored by means of the recording system as is set forth in greater detail hereinafter. The machine 10 is connected directly to a commutator contact 12 of a channel selector switch means 14 having a plurality of contacts which are periodically swept by the wiper arm 15. In order to monitor the on-off time of a machine, a path to a ground 16 is provided from an internal D.-C. voltage source 17 through a chopper 19, a stylus 20, a wire lead 21, the wiper arm 15, the contact 12, a wire lead 22, and a suitable on-off switch 24 connected to a ground 25 in machine No. 1, for example. When the switch 24 is closed current flowing in the stylus circuit causes a mark to be printed or developed on sensitive recording paper 27 mounted on a drum 26 disposed in the path of the stylus 20. The mark is printed on the recording paper for the period that current flows in the stylus circuit as the stylus 20 is moved with respect to time adjacent the recording paper, in accordance with any suitable rotating drum recording technique.

The rotatable drum 26 is substantially cylindrical and is mechanically coupled to and driven by a stylus and drum drive motor 28. The vertical height of the drum 26 is selected to accommodate at least the normal time period which is to be monitored by the recording system, such as one or more work days, and preferably the vertical height is selected to be of such an extent that printed marks are not made at the extremities of the drum. The diameter of the drum 26 is selected in accordance with the number of machines that may be monitored simultaneously although intermittently by the recording system.

A mechanical coupling or drive connection 29 is also provided to the wiper arm 15 of the channel selector switch 14, so as to electrically couple each of the commutator contacts 12 to the stylus circuit during successive rotations of the wiper arm 15. A standard telephone commutator switch can be used as the channel selector switch 14 and at least one contact is provided for each machine to be monitored by the recording system. For example, the diameter of the drum and the rate at which the drum is rotated may be selected to monitor the performance of 40 machines in separate channels over two second intervals with spacing intervals between successive recordings. However, in lieu of monitoring the performance of 40 machines, in a recording system set up for this many machines, it may be desirable to include at least one channel of the recorded data, a time marker to which the operation of the machines can be compared. For example, the contacts 30, 31 and 32 are connected by a wire lead 34 through a microswitch MS7 to a ground 35 for marking the recording medium in three channels with 20-minute markers. The remaining contacts are available for monitoring the outputs of other machines. The 20-minute marker circuit and an additional 1-hour marker circuit is described in greater detail hereinafter.

The chopper or rotary switch 19, which is included electrically in the stylus circuit, is mechanically coupled to and driven by the motor 28. The chopper 19 permits output signals from the wiper arm 15 of the channel selector switch 14 to be produced only after the wiper arm 15 enters the commutator contact area and disconnects the wiper arm from the stylus circuit just prior to the time that the wiper arm 15 leaves the commutator contact. By controlling the output period of the channel selector switch 14 in this manner, arcing between adjacent contacts of the commutator switch is prevented. As a further isolating measure and method for clearly separating columns of recorded data on the chart, a channel selector switch 14 having twice as many contacts as necessary may be used with channels being connected only to every second contact.

As shown in FIG. 2, the chopper 19 is included mechanically in a code producer circuit, to be described in detail hereinafter, and is rotated by suitable gear mechanisms in synchronism with but at a faster rate than the rotatable drum 26 so as to complete one revolution per contact segment of the channel selector switch 14. The commutator portion 36 of the chopper 19 is separated into an electrically conductive portion 37 and an insulating portion 38, and both of said portions are in contact periodically with a pair of electrical brushes 39 and 40. The electrically conductive portion 37 is in contact with both of the brushes 39 and 40 during the period that the wiper arm 15 is in contact with the central portion of a contact of the channel selector switch 14 to complete the stylus circuit. At all other times, one or both of the two brushes 39 and 40 are in contact with the insulating portion 38 to open the stylus circuit. Therefore, the stylus circuit is disabled just prior to the time that the wiper arm 15 leaves one commutator contact and until it is well onto the next contact. Consequently, there is no arcing between adjacent contacts as the wiper arm of the channel selector switch sweeps around the commutator contacts.

The stylus 20 consists of a movable arm 41 adapted to be moved in and out of a recording posture by means of a solenoid 42, which in turn connects electrically between the battery 17 and the ground 16, and the wiper arm 15 of the channel selector switch 14. Two electrically conductive support members 44 and 45 are provided adjacent a driven threaded lead screw 46 for electrically connecting the stylus 20 in the stylus circuit during the entire period that the stylus 20 is moved relative to time. The support members 44 and 45 are mounted in insulated relation between a base 47 and an overhanging arm 48. The support member 44 is connected to the wiper arm 15 and the support member 45 is connected to the battery 17, preferably through the chopper 19 (as shown in FIG. 1).

A stylus carrier 49 is provided with a threaded insulated aperture which communicates with the threads of the lead screw 46 for driving the stylus carrier 49 up and down the lead screw along a line parallel to the rotating axis of the drum. The lead screw 46 is rotatably connected to the arm 48 and through an opening 52 in the base 47 to a gear 54. A resilient, electrically conductive member 55 is mounted between the stylus carrier 49 and the electrically conductive support member 45 and serves to support the stylus carrier 49 in perpendicular relation to the member 45 while the stylus 20 is driven across the rotating surface of the sensitive recording paper 27 attached to the surface of the drum.

The solenoid 42 of the stylus 20 is connected to the support member 44 and to the electrically conductive member 55 in a suitable manner so that the stylus 20 is in a series circuit with the wiper arm 15 and the chopper 19.

A gear 55 is mechanically coupled to the stylus and drum drive motor 28 for driving the stylus carrier 49. A manually movable gear 56 is connected intermediate the gear 55 and the gear 54, which is connected to one end of the threaded lead screw 46. When the movable gear 56 is in place, the rotation of the gear 55 is transmitted to the gear 54 so that the lead screw 46 is driven thereby, and the stylus carrier moves in an upward direction over the surface of the recording paper 27 on the drum 26.

The stylus carrier 49 is driven at a rate which is determined by the ratio of the gears 54, 55 and 56 and the number of threads per inch in the lead screw 46 in order to have the stylus 20 vertically traverse the drum 26 in a preselected period of time. For example, the gear ratio and the number of threads can be adjusted to have the stylus 20 traverse the rotatable drum 26 in a 24-hour period. Accordingly, when one or more machines are monitored by means of the recording system, a bar graph indicative of the on-off time of each of the machines is recorded on the record paper 27.

A stylus return motor 57 is provided for returning the stylus from the top to a lower portion of the lead screw 46. A shaft 58 of the stylus return motor 57 is mechanically coupled to a gear 59, which is coupled in turn to the gear 54, driving the lead screw 46. A manually operable lever 60 is connected to the gear 56 for removing this gear from the stylus and drum drive circuit and for energizing the stylus return motor 57 by means of a microswitch MS1 which is positioned in the path of the movable gear 56 and closes when the gear is moved out of its engaged position to complete the A.-C. input circuit to the stylus return motor 57. The motor 57 drives the lead screw gear 54 through the gear 59 in a reverse direction and at an increased rate. Thus, the stylus carrier is rapidly returned to the bottom of the drum.

A code selector and a code producer may be included in the recording system for obtaining a coded signal representing the on-off time of one or more of the machines to be monitored. A machine to be monitored by means of a coded signal, such as the machine designated by the reference symbol 11, is equipped with a code selector 70, which is connected to the channel selector 14 of the system.

A respective code selector 70 is individually connected to each machine to be monitored by means of a code, and the code selector is coupled by cable to a code producer circuit 71 included in the recorder device of the system.

A solenoid of a relay 72 is connected at one terminal to the output of the machine 11, which may be an A.-C. output voltage terminal controlled by an on-off switch 73 in the machine. The other terminal of the solenoid 72 is connected across the A.-C. output of the machine through a contact 75 of a double-pole double-throw switch 76, when the switch 76 is in the down position as shown in FIG. 1. A movable switch arm 77 of the relay 72 makes contact with a contact 78 when the relay is energized. The movable switch arm 77 is connected in turn to a commutator contact 79 of the channel selector switch 14.

One contact of each of five double-pole, double-throw switches 81, 82, 83, 84 and 85, which are the code selector switches, are connected together and to one side of the solenoid 72 at the contact 75 of the switch 76. An electrical circuit is completed to the other side of the solenoid 72 through one or more movable contacts of each of the switches so that one or more indicator lamps 86, 87, 88, 89 and 90 may be energized to indicate the code selected for the machine. The other contact of each of the code selector switches 81–85 is connected through respective isolating diodes 91, 92, 93, 94 and 95 to each of the five channels of the code producer 71.

Each of the five channels of the code producer 71 are connected respectively to corresponding code selectors for all other coded machines in the system.

Provision is also made in the system for recording periods that the monitored machine is not operable because of shut down for mechanical reasons, rather than because the machine is not used, so that the overall performance of the machine can be recorded in addition to the mere on-off time of an operable machine. To this end, a transformer 100 is provided with a primary winding thereof connected to a conventional A.-C. voltage source. A circuit including the secondary winding of the transformer 100 may be completed to ground through an indicator lamp 101 connected to another contact 102 of the relay 72 when the relay is deenergized and the movable arm 77 of the relay 72 closes the circuit to the switch contact 103 with the switch 76 placed in up position. This circuit is called the "down-time" circuit of the recording system and the lamp 101 is lighted when the machine 11 is turned off and when the switch 76 is placed in the up position.

As shown in FIG. 2, the code producer 71 is driven by gears energizably connected to the stylus and drum drive motor 28. More particularly, a gear 110 mounted on the drive shaft 111 of the motor 28 drives a code producer gear 112 through a gear train. A stepped-up gear ratio is employed in order to rotate the code producer gear 112, for example, one complete revolution for at least each available channel in the system.

A commutating means 114 of the code producer 71 is driven by a shaft 115 attached to the gear 112. The commutator 114 is connected electrically to ground 119 through a brush 116. The commutator 114 which includes a collector ring 113 and a connection 114a to one of a plurality of spaced contacts 117, which sweeps over a plurality of brushes 126–130, inclusive, connected respectively to the code selector switches 81–85 of all of the code selectors 70. Accordingly, five channels are provided between the contacts of the code producer 71 and each of the code selectors 70. Since the commutator 114 is grounded, each time the spaced contact 117 sweeps across one of the brushes 126–130, the electrical circuit from the contact 79 of the channel selector 14 through the movable arm 77 and contact 78 of the relay 72 and a corresponding one of the closed contacts 81–85 of the code selector switch is connected to the ground 119 of the code producer 71. Therefore, for selected intervals depending on which of the code selector switches are closed, current flows to the ground 16 through the contact 79 of the channel selector switch 14, the wiper arm 15, the stylus 20, the chopper 19, and the battery 17 when the wiper arm 15 sweeps across the contact 79. Thus any code such as that indicated in FIG. 4 may be produced.

The one-hour relay circuit includes five sets of make and break relay contacts 121–125, inclusive, which are electrically interposed between the five code selector switches 81–85 of each of the code selectors 70 and the contact segments or brushes 126–130 of the common code producer 71, which are in contact with respective contact segments 117 thereof. When the one-hour relay 131 is energized the connections between the code producer brushes 126–130 and all of the code selectors 70 are broken and the five unit pulse output of the code producer 71 is fed through a conductor 132 and the conductor 21 to the stylus circuit.

The gear 110, mentioned previously in regard to the code producer circuit, also drives a one-hour gear 134. A shaft 135 is connected to the one-hour gear 134 for driving a notched cam 136, which controls a microswitch MS9 positioned in the rotating path to the notched cam 136. A movable detent 137 of the microswitch MS9 is adapted to fall into the notch for each revolution thereof, whereby a voltage source 138 is connected to the terminals of solenoid of the relay 131 through the microswitch MS9. Accordingly, five dashes or one-hour markers are printed in each monitoring channel used in the recording system each hour as though a five-dash code were selected in the code selector.

A microswitch MS5 is also disposed in the travel path of the one-hour cam 136 to deenergize the stylus and drum drive motor 28 each time the one-hour cam 136 makes a complete revolution, unless a manually operable calibration switch S6, which is connected in shunt with the microswitch MS5, is in a closed position.

A 20-minute gear 139 is driven by the one-hour gear 134. A shaft 133 connects the gear 139 to a 20-minute cam 140 which controls the operation of the 20-minute marker circuit. To this end, the cam 140 has three spaced notches 140a, which are positioned relative to the notch in the one-hour cam 136 for generating three solid markers in selected columns on the chart within the one-hour period, in response to the operation of a microswitch MS7 which is disposed in the rotating path of the 20-minute cam 140 and is connected electrically between the contacts 30, 31 and 32 of the channel selector switch 14 and the ground 35.

Accordingly, each time the channel selector switch is rotated over these contacts a path to ground is provided for current to flow in the stylus circuit; however, as previously indicated, the 20-second marker circuit is only included electrically in one or more separate channels so that only these channels are printed with one-hour markers and 20-minute markers, whereas the one-hour markers occur in every channel of the recording system that is used.

Thus, the bar graph recordings or the coded recordings that occur in the various channels employed can be compared to a time reference which is printed in those selected channels devoted only to the time markers. Additionally, since the 20-minute markers are repetitive, at the one-hour mark five dashes are printed above the solid line of the 20-minute mark and adjacent thereto.

The calibration switch S6, as mentioned previously, is connected in parallel with the microswitch MS5, which is connected in series in the A.C. input circuit of the stylus and drum drive motor 28. When the calibration switch is closed, the stylus and drum drive motor 28 is not deenergized each time the one-hour cam 136 makes a complete revolution and opens the microswitch MS5. However, if the calibration switch is opend when the recording period of the stylus is ended, i.e., either at the end of the 24-hour recording period or prior thereto, the stylus and drum drive motor 28 stops when the microswitch MS5 falls in the groove in the one-hour cam 136.

If the motor 28 is stopped by the action of the microswitch MS5, the one-hour relay 131 is not energized because the microswitch MS9 is set to operate after the microswitch MS5. The motor 28 can then be reenergized by closing the calibration switch S6, and the one-hour markers (5 dashes) will be made in each monitored channel and time channel prior to recording of any on-off time signals representing the machines being monitored. Thus, a time reference base is initially provided for analyzing the on-off date recorded on the recording paper and pre-calibrated paper need not be required. This eliminates the problems connected with aligning the precalibrated time markers on the recording paper with the position of the stylus.

Three sensing circuits are provided for controlling the vertical distance that the stylus carrier 49 can travel on the lead screw 46. The first sensing circuit determines when the overall recording period is normally ended. The lead screw and its gear 54 are mounted in the opening 52 in the base so that they are movable axially. A spring 141 positioned between a collar 142 secured to the lead screw 46 and a bushing 143 mounted on the base 47 biases the lead screw 46 and the gear 54 in an upward direction. Another spring 144 is fixedly connected at one end thereof to the overhanging arm 48 through an opening 145, the other being free and extending downwardly beyond the post 61. The length of the spring 144 is adjusted so as to enable the spring to be compressed sufficiently when the stylus carrier 49 reaches the end of the 24-hour recording period, so that the lead screw 46 is then forced downwardly as the rotation of the lead screw 46 continues. The movable detent of a microswitch MS3 is positioned in contact with the gear 54 and in an actuated condition and the microswitch MS3 is connected electrically in series with the A.C. input voltage to the stylus and drum drive motor 28. The microswitch MS3 is adjusted to open the circuit to the motor 28 when the lead screw 46 and gear 54 are displaced downwardly a selected distance, so that the stylus carrier is stopped at the end of the recording period.

The second sensing circuit is an emergency cut-off circuit which is provided to stop the motor 28 in the event that compression of the spring 144 does not result in stopping the motor 28. To this end, a post 61 is connected to the overhanging arm 48 in the travel path of the stylus carrier 49. Accordingly, if the stylus carrier 49 is driven too far, it contacts the post 61, stopping its upward travel. Continued rotation of the lead screw 46 causes the spring 141 to be compressed so that the lead screw 46 and its gear 54 are further displaced in a downward direction.

The movable detent of another microswitch MS4 is in compressed engagement with the gear 54 in its normal operating position. Microswitch MS4 is also connected in series with the A.-C. input voltage to the stylus and drum drive motor 28. The movable detent of the microswitch MS4 is adjusted to open the circuit when the lead screw 46 and the gear 54 are forced downwardly an even greater distance than in the case of the microswitch MS3. Thus, the motor 28 is stopped when the stylus carrier 49 is driven against the post 61 and the gear 54 is displaced.

The third sensing circuit limits the return path of the stylus carrier 49. For this purpose, a movable post 146 is positioned in an opening 147 of the base 47 in the downward travel path of the stylus carrier 49. One end of the post 146 is connected to the detent of a microswitch MS2. The microswitch MS2 is connected electrically in series in the A.-C. input voltage supply circuit to the stylus return motor 57. Thus, when the stylus carrier 49 is returned toward the base 47 and strikes the post 146, the motor 57 is deenergized. In this manner, not only is the return path of the stylus carrier 49 limited, but the stylus carrier is returned to the same starting position. Accordingly, the base line of the recordings made on the recording paper begin in substantially the same position each time the recording system is used.

A decoupling device 150 is provided for rotating the drum 26 independently of the shaft 111, which is driven by the stylus and drum drive motor 28 so that the recording paper 27 can be mounted on the surface of the drum 26. As shown in FIGS. 2 and 3, the upper portion of the shaft 112 that drives the drum 26 is threaded. An opening 151 is provided in the top of the drum surface and an opening 152 is provided in an intermediate partition 153 for receiving the shaft 111. A coupling 154, about which the overhanging arm 48 is mounted, is inserted in the opening 151 in the drum 26 and is secured thereto. A central opening 155 is provided in the coupling 154 to receive the shaft portion 112. Additionally, a spring 160 is disposed on the shaft 111 and rests on a collar 161 attached to the shaft 111. When the shaft 111 is inserted in the openings 152 and 155, the spring 160 is compressed to some degree by the weight of the drum 26. The openings 152 and 155 are selected to be larger than the diameter of the shaft 111 which passes therethrough, so that the drum 26 is freely rotatable and axially movable thereon.

One end of the coupling 154 is provided with a detent surface 156. Similarly, a mating detent surface 157 is provided in a mating coupling 158. A threaded opening 159 is formed in the mating coupling 158 so that when the drum is depressed against the spring 160, the mating coupling can be screwed onto the thread portion 112 of the shaft 111.

When the mating coupling 158 is merely screwed onto the threaded portion 112 of the shaft 111 and the detent surfaces 156 and 157 are not meshed, the drum 26 can be rotated on the shaft 111 since it is not connected directly to the shaft. On the other hand, when the detent surfaces 156 and 157 of the couplings 154 and 158 are meshed the mating coupling 158 is driven by the shaft 111 and it in turn drives the drum 26 through the connection of the detent surfaces.

When the recording paper 27 is to be mounted on or removed from the drum, the drum is depressed and rotated to break the mechanical joint between the detent surfaces 156 and 157 of the couplings, although the couplings remain partially in spaced contact with each other due to the configuration of the detent surfaces. Then the ends of the recording paper 27 can be inserted underneath or removed from under a taut band 162 connected across the surface of the drum 26 as is described more fully in copending application Serial No. 60,067, filed October 3, 1960, now Patent No. 3,066,301, entitled "Recording Paper," by John E. Gorrell and William B. Leavens, Jr.

A further sensing circuit responsive to the position of the drum 26 is provided in order to prevent the drum from being operated inadvertently with the detent surfaces 156 and 157 unmeshed, which condition would introduce errors into the recordings occurring in the various channels, since the drum could then be displaced downwardly from the position it would otherwise be in if the detent surfaces 156 and 157 were meshed.

A movable post 165 is disposed in an opening 166 in the base 47 and protrudes upwardly into the rotational path of the drum 26. One end of the post 165 is connected to the movable detent of a microswitch MS8. The microswitch MS8 is connected electrically in series with the A.-C. input voltage supply circuit to the stylus and drum drive motor 28. If the drum 26 is rotated while the detent surfaces 156 and 157 are not meshed, the drum strikes the post 165 and the microswitch MS8 opens causing the motor 28 to become deenergized. As an alternative, an alarm circuit, such as a lamp or bell, can be used to indicate the displaced position of the drum in lieu of or in addition to deenergizing the motor.

In operation, a code pattern or diagram can be set up for operating a plurality of machines equipped with code selector units 70. An illustrative pattern is shown in FIG. 4 which utilizes the binary system of coding circuits to identify a company or a department thereof.

For example, for A company, the code selected is the 5-dash pattern; for B company the code is a 4-dash pattern; for C company the code is a 4- and a 5-dash pattern; for D company the code is a 3-dash pattern; and for E company the code is a 2- and 3-dash pattern. Since there are in the illustrative embodiment five code elements, there are 31 different combinations possible for identifying a variable function with a code pattern, in accordance with conventional binary coding techniques.

If machine 10 performs a continuing sequence of operations, as would be the case with a punch press or printing press, for example, the switch 24 may be connected to the actuating means and opened and closed in synchronism with the operation of the machine. If the operating period of each punching or printing operation is less than the marking interval during which the contact 12 of the channel selector means 14 is engaged, a plurality of distinct marks will be recorded during the marking interval. Thus, the bar graph will provide a record of the frequency of operation of a machine.

Thus there has been provided in accordance with the invention a novel and unobvious system for obtaining a bar chart record of the operation of a large plurality of machine elements, and in which the recorded data pertinent to each machine may be selectively coded to indicate the function or type of operation in which that particular machine is engaged during any period of time.

It will be understood by those skilled in the art that the above described detailed embodiment is meant to be merely exemplary and that it is susceptible of modification and variation without departing from the spirit and scope of the invention. For example, each of the various independent circuits utilized in the system may be energized in a conventional manner either by A.-C. or D.-C. Further, while five code elements are disclosed, the actual number of code elements that can be used is a function of the nature of the information to be recorded. Also, a plurality of machines can be monitored over each channel in accordance with well known multiplexing techniques. The actual recording operation may be effected in accordance with any conventional techniques, such as the combinations of pressure sensitive paper and a marking stylus, electrically sensitive paper and an electrically energized stylus, or paper and an inking stylus. Therefore, the invention is not deemed to be limited except as defined by the appended claims.

I claim:

1. A recording system for recording at least two parameters for each of a plurality of devices, comprising a rotatable drum having a recording sheet attached to and carried by said drum, a stylus disposed along a line parallel to the rotational axis of said drum and movable adjacent to said paper in accordance with one parameter to be recorded for each said device for selectively marking said sheet, means connected in circuit relation with said stylus for selectively enabling said stylus to mark said sheet during periodically recurring marking intervals each associated with a respective device and in response to a signal representing another parameter to be recorded for each of said devices, and means connected in circuit with said enabling means for selectively controlling the periods when said stylus is responsive to said signal to mark said sheet in accordance with one of a plurality of preselected coded patterns during each of said marking intervals.

2. A recording system as set forth in claim 1 wherein said stylus is movable with respect to time.

3. A recording system as set forth in claim 1 wherein said another parameter represents the operating condition of a controllable device.

4. A recording system adapted to record at least two parameters for each of a plurality of devices, comprising a rotatable drum having a recording sheet attached to and carried by said drum, a stylus disposed along a line parallel to the rotational axis of said drum and movable adjacent said paper in accordance with one parameter to be recorded for each said device for selectively marking said sheet, means connected in electrical circuit relation with said stylus for selectively energizing said stylus to mark said sheet during periodically recurring marking intervals each associated with a respective device and in response to an electrical signal representing another parameter to be recorded for each said device, and means connected in circuit with said means for selecting the number of times said stylus is energized by said electrical signal to mark said sheet in accordance with one of a plurality of preselected coded patterns during each of said marking intervals.

5. A recording system as set forth in claim 4 wherein said enabling means is connected periodically to said stylus to print a bar graph of said two parameters on said sheet.

6. A recording system adapted to record at least two parameters representative of the operating characteristics of a plurality of controllable devices, comprising a rotatable drum having a recording sheet attached to and carried by said drum, a stylus disposed along a line parallel to the rotational axis of said drum and movable adjacent said sheet in accordance with one parameter to be recorded for said devices, select means connected in electrical circuit relation with said stylus for selectively enabling said stylus to mark said sheet periodically in response to an electrical signal representing another parameter to be recorded for said devices, whereby said stylus marks said sheet during a periodically recurring marking interval, and code means connected in circuit with said enabling means for selecting the number of times said stylus marks said sheet in accordance with one of a plurality of coded patterns during each of said marking intervals.

7. A recording system adapted to record an operating characteristic for each of a plurality of controllable device, comprising a rotatable drum having a recording sheet attached to and carried by said drum, a stylus disposed along a line parallel to the rotational axis of said drum and movable adjacent said sheet over a period of time, rotary selecting means connected in circuit with said stylus for selectively enabling said stylus to mark said sheet periodically in response to an electrical signal representing the operating characteristics of each said device during recurring marking intervals each associated with a respective device, and means connected in circuit relation with said rotary means for selecting during each marking interval the number of times said stylus marks said sheet in accordance with one of a plurality of preselected coded patterns and in response to said electrical signal.

8. A bar chart recording system for a plurality of controllable devices, comprising a rotatable drum having a recording sheet mounted on said drum, a stylus disposed along a line parallel to the rotational axis of said drum and movable adjacent said paper, a means for selectively enabling said stylus to mark said sheet during periodically recurring marking intervals each associated with a respective controllable device, respective signal producing means for each of the controllable devices and interval selecting means for connecting each of said signal producing means to said stylus during said respective marking intervals to record a bar graph for each of the controllable devices representative of the operational condition of the device, at least one of said signal producing means being selectively controllable to produce a coded pattern on said recording sheet during said marking interval representative of one of a plurality of operational conditions.

9. A bar chart recorder system as set forth in claim 8 in which said selectively controllable signal producing means comprises a plurality of switching means, a code producing means for producing a predetermined plurality of code pulses during a marking interval, said switching means being operable to select one or more of said code pulses to energize said stylus to record a coded pattern during said marking interval.

10. A bar chart recording system, as set forth in claim 8, comprising means for introducing timing signals into each of said bar graphs.

11. A recording system for recording at least two parameters for each of a plurality of controllable devices, comprising for a rotatable recording drum having a stylus movable in a predetermined path parallel to the rotational axis of said drum, drive means for rotating the drum and selectively driving the stylus in one direction along said path in accordance with one parameter to be recorded for said devices for selectively marking said sheet, means connected in circuit relation with said stylus for selectively enabling said stylus to mark said sheet periodically in response to a signal representing another parameter to be recorded for each of said devices whereby said stylus marks said sheet during a periodically recurring marking interval, means connected in circuit with said enabling means for selectively controlling the periods when said stylus is responsive to said signal to mark said sheet in accordance with one of a plurality of preselected coded patterns during each of said marking intervals, selectively energizable means for driving the stylus in the opposite direction along said path, means for disabling the selective drive of the stylus in said one direction, means responsive to said disabling means for energizing said opposite direction driving means for driving said stylus in said opposite direction along said path, and position sensing means for determining that said stylus has moved to a predetermined position on said path for deenergizing said opposite direction driving means.

12. A drive system as claimed in claim 11, comprising position sensing means for determining that said stylus has moved to a second predetermined position on said path for disabling said drive means to prevent further rotation of said drum and further movement of said stylus in said one direction.

References Cited by the Examiner
UNITED STATES PATENTS

| | | | |
|---|---|---|---|
| 749,305 | 1/04 | Lenot | 346—113 |
| 2,277,427 | 3/42 | Woodson | 346—34 |
| 2,303,840 | 12/42 | James | 346—138 |
| 2,424,622 | 7/47 | McClure | 346—23 |
| 2,496,392 | 2/50 | Hasbrook | 346—23 |
| 2,680,378 | 6/54 | Moe | 74—84 |
| 2,746,834 | 5/56 | McLean | 346—113 |
| 2,863,710 | 12/58 | Cooper et al. | 346—34 |
| 2,961,879 | 11/60 | Hudson | 74—84 |
| 2,986,443 | 5/61 | Leutert | 346—138 |
| 3,060,430 | 10/62 | Paschkis | 346—32 |
| 3,075,192 | 1/63 | Byan et al. | 346—49 |

LEO SMILOW, *Primary Examiner.*

NEWTON N. LOVEWELL, EMIL G. ANDERSON, *Examiners.*